United States Patent [19]

Lucas

[11] Patent Number: 5,309,608
[45] Date of Patent: May 10, 1994

[54] ACCESSORY ATTACHMENT

[76] Inventor: Theresa L. Lucas, 8170 Chestnut Blvd., Broadview Hts., Ohio 44147

[21] Appl. No.: 705,591

[22] Filed: May 24, 1991

[51] Int. Cl.$^5$ .............................................. A41D 1/00
[52] U.S. Cl. ...................................... 24/304; 24/306; 24/DIG. 11
[58] Field of Search ................ 24/304, 306, 447, 442, 24/963, DIG. 11; 2/DIG. 6, 319, 338, 337; 248/205.3; 8/150

[56] References Cited

U.S. PATENT DOCUMENTS

| 187,405 | 2/1877 | Moulton | 24/712 |
|---|---|---|---|
| 258,215 | 5/1882 | Brown | 24/302 |
| 1,322,257 | 11/1919 | Miller | 24/DIG. 11 |
| 1,426,569 | 8/1922 | Ingram | 24/DIG. 11 |
| 1,638,073 | 8/1927 | Van Heusen | 24/442 |
| 2,068,703 | 1/1937 | Powdermaker | 24/DIG. 11 |
| 2,475,914 | 7/1949 | Peterson | 24/712 |
| 2,532,011 | 11/1950 | Dahlquist | 24/DIG. 11 |
| 2,639,479 | 5/1953 | Dahm | 24/16 R |
| 2,750,315 | 6/1956 | Tierney | 24/16 R |
| 2,784,131 | 3/1957 | Fletcher, Jr. | 24/DIG. 11 |
| 3,031,359 | 4/1962 | Blank et al. | 24/DIG. 11 |
| 3,257,678 | 6/1966 | Batchelder et al. | 24/DIG. 11 |
| 3,947,896 | 4/1976 | Taylor | 24/DIG. 11 |
| 4,642,815 | 2/1987 | Allen | 2/DIG. 6 |
| 4,672,722 | 6/1987 | Malamed | 2/DIG. 6 |
| 4,941,237 | 7/1990 | Hovis | 24/304 |
| 4,965,902 | 10/1990 | Mazzoli | 8/150 |
| 5,030,491 | 7/1991 | Shoesmith | 24/DIG. 11 |

FOREIGN PATENT DOCUMENTS 0294362  12/1988  Japan .................................... 24/304

Primary Examiner—Victor N. Sakran
Attorney, Agent, or Firm—Lightbody & Lucas

[57] ABSTRACT

A method for attaching articles of clothing together, which method includes the use of a plastic tape which has been coated on both sides with releasable adhesive, which releasable adhesive has been selected so as to be appropriate for the specific qualities of the articles which are to be attached together. The suitability of the releasable adhesives for the particular articles is indicated directly on the sides of the tape by words, color, or other indication means.

19 Claims, 4 Drawing Sheets

1

ACCESSORY ATTACHMENT

FIELD OF THE INVENTION

This invention relates to a new fastener for articles in need of a selective attachment.

BACKGROUND OF THE INVENTION

Historically, there have been many ways of selectively interconnecting pieces of fabric, leather, plastic and other items. For consumer applications these means include buttons, zippers, laces, pins, velcro, and other familiar attachments. Atypically these attachments necessitate the permanent modification of one and/or both items to be interconnected. Additionally, the consumer has no choice as to the location, durability and other attributes of the interconnection. Due to these limitations, the consumer is generally either stuck with the designed fasteners as supplied by the manufacturer or does without the fastener. Frequently damage is done by other types of makeshift fasteners (for example a safety pin damages a silk dress). An example of the former are the belt loops which are generally included with articles of clothing. As an example of the latter, the peasant look with a blouson top necessitates frequent adjustment due to the lack of any method of maintaining the blouson top reliably above the wearer's belt. The problems of these previous methods combine to limit the design attributes of articles of clothing as well as causing the wearer to improvise makeshift solutions in order to obtain a certain look.

SUMMARY OF THE INVENTION

It is an object of this invention to provide for a reliable selective interconnection between articles of clothing.

It is an object of this invention to simplify the design of articles of clothing.

It is an object of this invention to provide comfort to the wearer.

It is an object of this invention to conform various articles of clothing to various body shapes.

It is an object of this invention to promulgate the creativity of wearers of articles of clothing.

It is an object of this invention to simplify the interconnection between articles of clothing.

It is an object of this invention to reduce the cost of the interconnection of articles of clothing.

Other objects and a more complete understanding of the invention may be had by referring to the following description and drawings in which:

DESCRIPTION OF THE PREFERRED EMBODIMENT

Figure 1:
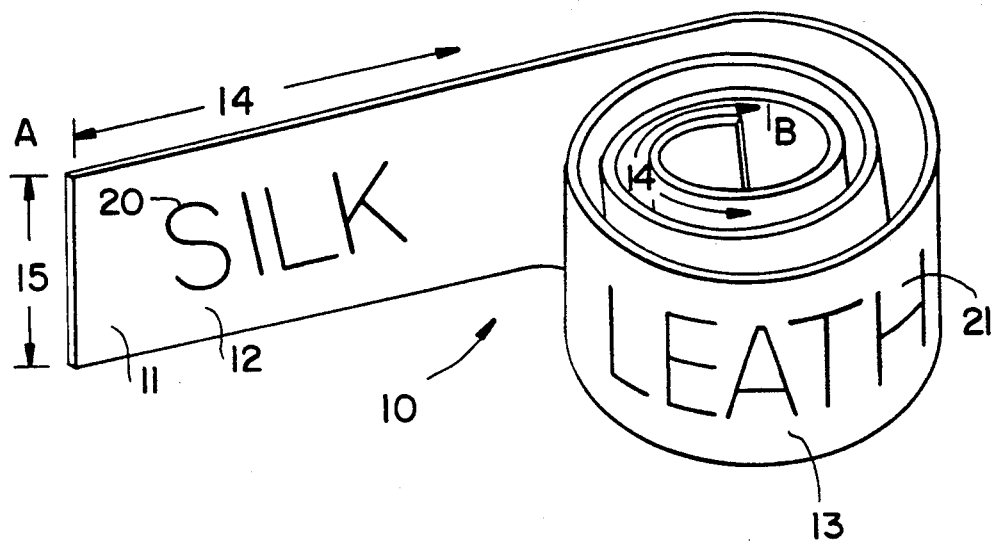
FIG. 1 is a loose roll of the preferred embodiment of the invention

This invention relates to an improved attachment appliance for clothing and other articles. The invention will be described in its preferred embodiment of a cosmetic utility for women's wear and in the implementation of a double sided tape.

The double sided tape 10 has a body 11 with a first side 12, a second side 13, an application length 14, and a width 15.

The body 11 for the tape 10 serves as the structural carrier for the two sides 12, 13 of the tape 10. By structural carrier it is meant the plastic, cloth, or material which serves as the physical part of the tape. The actual material and/or attributes for each side of the body would be selected to match the intended application for the particular tape. For example a side to be used with suede would have a rougher surface texture than a side to be used with a smooth plastic surface. An additional example is a side used with silk would have a finer density than one used with wool. In general, the tougher the surface, the tougher the texture/density of the side of the tape to be used with such surface (cloth, plastic, silk or other materials can act as the body 11 for the tape 10). (Note that with any surface, a sand paper like texture would facilitate the interconnection, albeit at the risk of slight damage to the surface with each use.) The preferred body 11 of the tape 10 is a plastic polyesterine material having a flexibility and density similar to that of wax paper.

Figure 2:
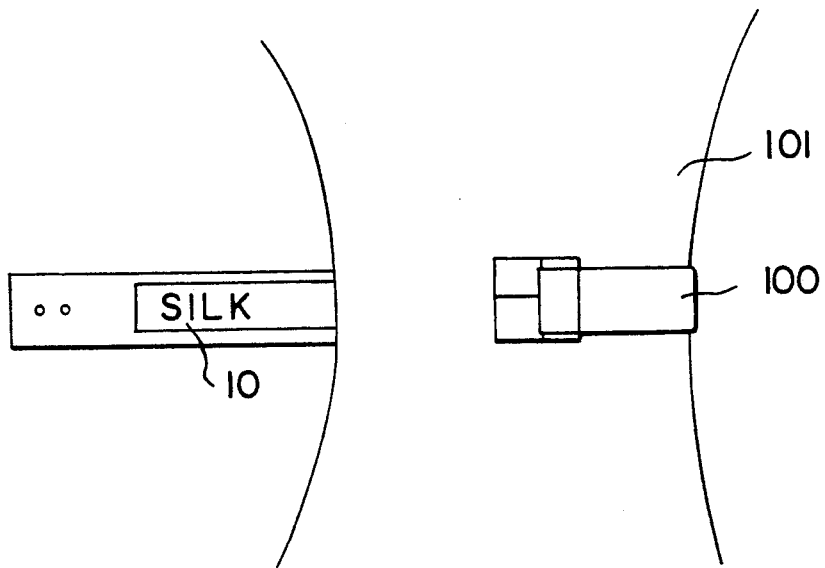
FIG. 2 is atypical application involving the preferred embodiment of FIG. 1.

The two sides 12, 13 of the tape 10 serve as the carrier media for the attachment means of the tape. By attachment means it is meant the substance or device which can selectively removably interconnect the side of the tape to the surface of the article of clothing such side will face. It is preferred that the attachment means utilized on the two sides 12, 13 be a releasable glue such as that used on the familiar Post-it Notes manufactured by 3M Corporation. The adhesive qualities of the glue are again selected to match the application with which the particular tape 10 is going to be utilized. For example if the belt 10 is going to be utilized with a blouson silk dress and a leather belt (as shown in FIG. 2), the adhesiveness of the side which will be utilized with the belt, in this case side 12, is selected such that it is: A) non-damaging to leather; B) stable with a non-porous, somewhat greasy surface; and, C) non-staining. The glue utilized on the second side 13 of the tape 10 in our example of FIG. 2 would be suitable for use with a silk material. The glue, therefore, would not be damaging to a material which is: A) natural fiber; B) porous; and/or, C) normally dyed. An additional example is if the tape 10 is to be utilized between a belt and a dress, the tightness of the belt against the dress would allow a rough or multiple pin-point material to be utilized without any glue; the physical force of the belt would normally prevent the separation of the side of the tape 10 from the dress. (A very light object could also be similarly connected.) It is preferred that a tape having minimum adhesive qualities be used for the various applications. This allows the job to be done without the risk of incurring undue damage to the surface with which such tape is utilized. (Excess adhesive qualities could leave a residue on the surface and/or damage the material.)

It is preferred that each side be distinctly labelled in order to properly identify to the consumer how the particular tape 10 is to be utilized. This is especially so in the event that there is a distinction between the material and/or adhesive means between the two sides 12, 13 of the tape 10. This identification can be a labelling of sides as a "silk" side 20 and a "leather" side 21 as shown in FIG. 1. This identification unambiguously identifies the two sides for the consumer. This is preferred as an actual identification of the material with which such side is to be used. (This is especially desirable where the glue utilized on one side 12 may be unsuitable for the material being utilized with the other side 13.) This identification can even be therapeutic to give a sense a security to the consumer even though both sides may have an identical glue. Alternately numbers, colors, letters, or combinations can be utilized to identify the qualities of the sides. It is preferred that both the materials are attached and the strength of the adhesive means be identified for each side. This can be easily done using words for the material and color for the strength. It is likely that a user would desire differing strengths of connection between the same materials at differing times. For example, it takes less strength to join a cotton top to a wool skirt when a belt is going to be used also than when one is not going to be used. This gives a user additional choices in an easy to recognize manner.

Figure 3:
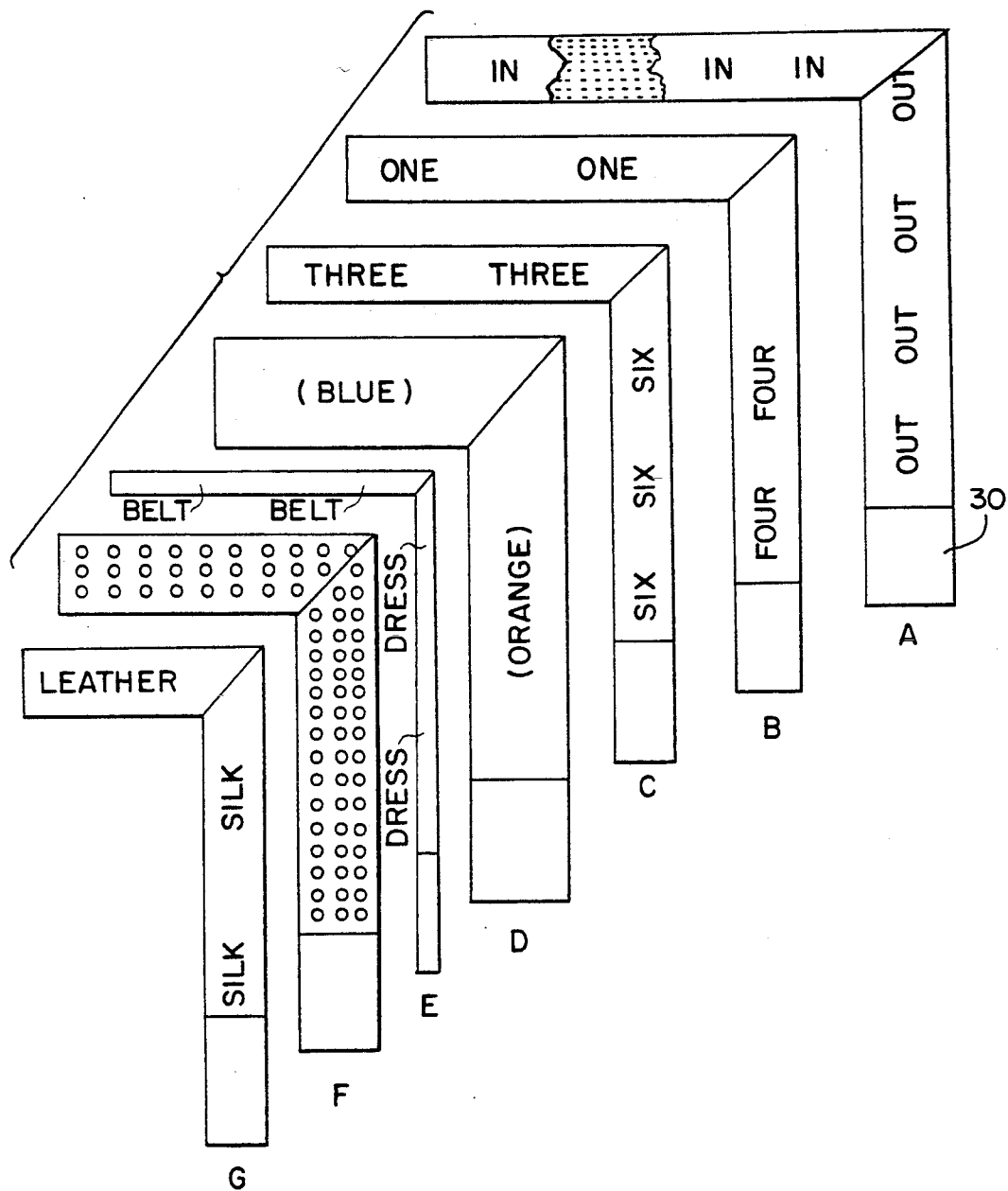
FIG. 3 is a detailing of alternate embodiments of the invention.

As can be seen in FIG. 3, the types of identifications of the two sides range from in and out (FIG. 3A), numerical (FIGS. 3B and 3C), color (FIG. 3D), identification of use (FIG. 3E), pattern (FIG. 3F), identification of surface with which a side is to be used (FIG. 3G), or a combination of any of the above. An identification of use or an identification of surface are preferred due to their ease of recognition by the user. In the event that there is a range of choices for any particular selection, as in numbers or colors or titles, the variations of such range or titles can be utilized to indicate to the consumer the strength, suitability and/or other properties of the particular glue being utilized on such side. This facilitates the usage of the tape 10 by providing a natural reinforcement for the instructions which would accompany the tape 10.

The length 14 of the tape 10 is selected to match the particular application that the particular tape is going to be utilized in. As an example of this in FIG. 2, the tape 10 is being utilized as a method of connecting a silk dress to a belt. For this reason the length 14 of the tape 10 is selected to be the substantially 28" waist measurement of the particular model which is using the embodiment of FIG. 2. Note that the tape 10 is preferably marketed in long rolls instead of discreet lengths (although some sort of length markings, inch marks or whatever, are helpful). Note also that the length 14 and the width 15 may vary for a tape 10 having sides 12, 13 with given qualities. Example rolls 30 can be seen immediately above the identification letters A-G in FIG. 3. These rolls 30 would each contain multiple lengths of tape each designed to match the particular application for which that particular tape 10 is marketed. As an example of this, a tape marketed for use to hold the heel of a shoe onto a person's foot (FIG. 4) would provide 75 applications in a tape but 25' long. However, in the case of the 28" tape for the dress in FIG. 2, 75' would provide but perhaps 20 applications. For this reason normally a greater length of tape would be chosen for use with the application of FIG. 2 than with the application of FIG. 4. In either event, a months use of tape per roll 30 is preferred. This provides a customer with a reasonable number of uses while also insuring the freshness of the attachment means for the tape. Alternately, and particularly suitable for a "generic" use with almost anything tape, an arbitrary length can be provided. Note that each roll 30 would preferably be provided in its own integral dispenser. These dispensers could be those such as used for scotch tape and/or adhesive tape. The dispensers could also be multiple, each holding a number of discreet rolls 30. The use of these dispensers would facilitate the usage of the tape by allowing for easy unambiguous storage and usage for the tapes. Preferably the outside of the dispensers would be marked with the identification of the qualities of the tape 10 if such qualities were not readily apparent from viewing the tape on the roll 30.

The width 15 of the tape 10 is chosen to match the particular application with which the particular tape 10 is to be utilized. In this respect, in that various applications may have differing parameters, it is likely that an individual will need to stock more than one tape for a particular application and/or use the tape in multiples in order to cover all contingencies. As an example of this, a tape with a width 15 of 2" is obviously going to be unsuitable for use with a ½" wide belt. However, a tape with a width of ½" can be used in a 2" wide application by itself or in multiples. In any event with the increasing width 15 of the tape 10, the attachment means used on the two sides 12, 13 of the tape can have lower adhesive qualities while providing for a given strength of holding. In addition, again the intended use (belt on dress for example) would also modify the adhesive qualities. It is, therefore, preferred that the widest tape 10 be utilized in any particular application in order to minimize the adhesiveness of the glues used therewith.

The tape 10 would be utilized in any number of differing applications. These applications include in a blouson type silk dress (FIG. 2), a shoe (FIG. 4), a broach (FIG. 5), a shoulder scarf (FIG. 6), a slip (FIG. 7), and a shoulder pad (FIG. 7).

To use the invention with a blouson type silk dress, the user reels off a length 14 of tape 10 and presses it onto the inner surface of the leather belt 100. The length 14 of the tape 10, the width 15 of tape 10, and the nature of the glue utilized on the two sides 12, 13 has been previously selected to match this particular application. After the user has pressed one side of the tape 10 to the belt 100, the user locates the belt 100 at the approximate place on the fabric 101 of the silk dress which will eventually correspond to the user's natural waist line. This action will preliminarily interconnect the belt 100 with the fabric 101 via the tape 10. At this time, the user moves the belt 100 (and the interconnected dress material 101) up to the user's natural waistline and fastens the belt around such waistline. Thereafter, due to the use of the tape 10 between the belt 100 and the material 101, the material will remain in its position in respect to the belt 100. In specific, the material 101 will not slip through the belt 100 so as to eliminate the blouson look from the dress. The dress is thus held in its position even though there are no belt loops on such dress. Note that the tape 10 could be utilized, for example, between a shirt and a skirt to prevent shirt ride-up (normally at the back) or to otherwise hold two articles in place in respect to each other.

Figure 4:
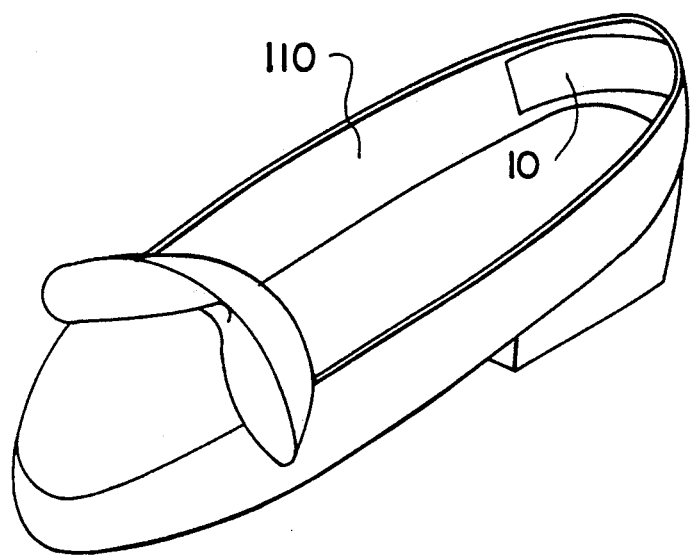
FIG. 4 is a second application of the invention involving a shoe.

In the application of FIG. 4, the tape 10 is pressed by the user into the heel of a shoe 110. Again the glue used on the two sides 12, 13 together with, the length 14 and the width 15 of the tape 10 have been selected to match the particular application. After the tape 10 is inserted into the heel of the shoe 110, the user inserts their foot into the shoe 110. Thereafter, the tape 10 will hold the heel of the shoe 110 in place on the foot of the user.

Figure 5:
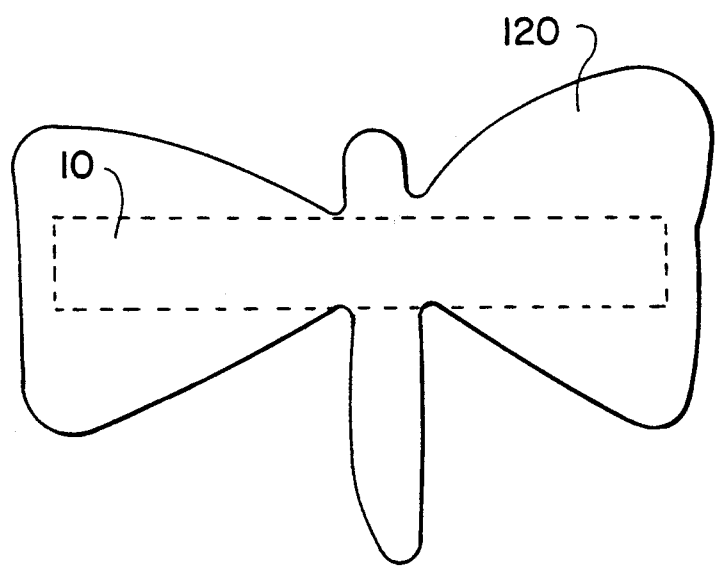
FIG. 5 is a third application of the invention involving a butterfly shaped brooch.

In the application of FIG. 5, the tape 10 is pressed onto the back of a brooch 120 by the user (after again pre-optimizing the qualities of the tape to the particular brooch 120). The user can then stick the brooch 120 wherever they desire, knowing that it will be held in place by the tape 10.

Figure 6:
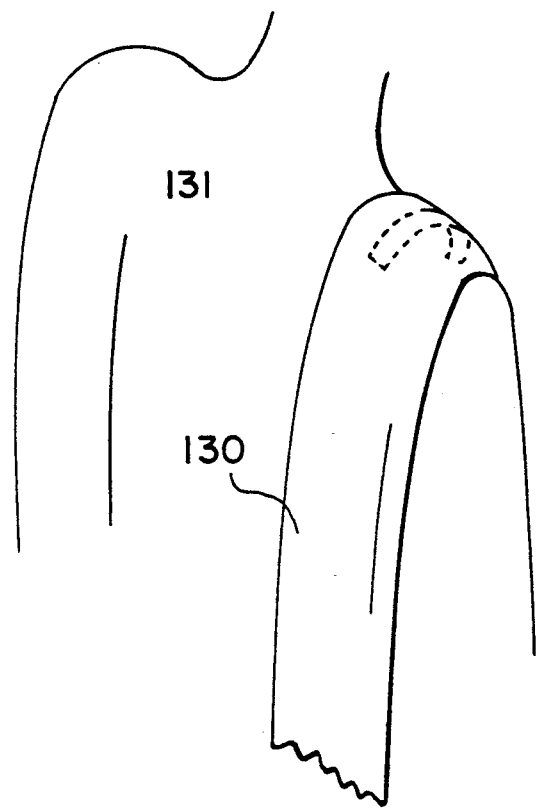
FIG. 6 is a fourth application of the invention involving an over the shoulder scarf; and, FIG. 7 is a fifth application of the invention involving a bra, a slip, and a shoulder pad.
Figure 7:
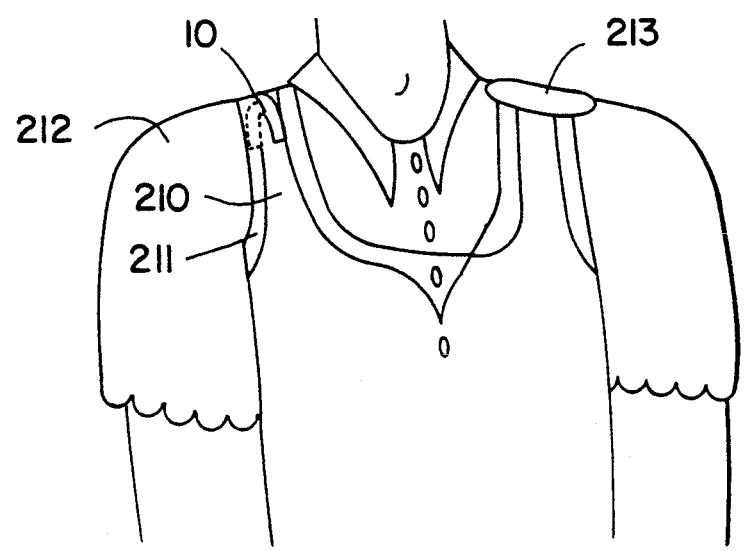

In the application of FIG. 6, the scarf 130 needs to be held onto the shoulder of the user. The user places selected tape 10 onto the shirt or top 131 at the intended location and then assembles the scarf 130 into the preferred look. Upon pressing the scarf 130 into place, it will thereafter be held in place. (Note that the tape 10 could be used in a similar fashion to hold a curling lapel down or to otherwise interconnect two parts of the same material.)

The invention could also be utilized to fasten other articles of clothing together. As an example of this, in the application of FIG. 7 (left side for clarity), the strap 211 of an intermediate garment (such as a slip) is connected to the strap 210 of an inner garment (such as a bra). To do this, the tape 10 is pressed on the top of strap 210 and thereby connecting to the bottom of strap 211. Again, the adhesive used on the two sides 12, 13 together with, the length 14 and the width 15 of the tape 10 have been selected to match the particular application. After the tape 10 is joined between the two straps 210, 211, the wearer feels secure with effectively one strap upon the shoulder. The need for constant adjustment is obliterated. Further, the top of strap 211 can additionally be united with the outer garment 212 when the tape 10 is connected therebetween. Thereafter, the tape 10 deters either strap 210, 211 from falling off the shoulder to cause any discomfort.

Furthermore in the application of FIG. 7 (right side for clarity), the tape 10 can also couple together the top of strap 211 and the bottom of outer garment 212 to each side of a shoulder pad 213. Again, the adhesive used on the two sides 12, 13 together with, the length 14 and the width 15 of the tape 10 have been selected to match the particular application. After the tape 10 is linked between the straps 210, 211, the shoulder pad 213, and the outer garment 212, the wearer can feel tailored realizing each item has been placed in a location which best fits and becomes her personal structure. Further, this is accomplished without any pins, velcro, or other damaging connection means or sewn in pockets, pre-located snaps, or other expensive tailored means.

The invention thus has advantages in that it provides for a secure, non-damaging, non-bulky, inexpensive attachment means. Further, the invention can be used with any garment to releasably fasten something in a selectable position, a position that can vary at the user's discretion. This allows a user to have utility with fashion considerations as well as personal comfort and convenience.

In all of the embodiments, the tape 10 can be removed from the particular items with which it was utilized at the conclusion of the use and discarded in a trash receptacle. Due to the selection of the glues used on the two sides 12, 13 of the tape 10, normally there will be no residue to clean off of the articles with which the tape is utilized. Thereafter upon a new usage of the articles, the user selects a new length of tape 10 and begins the process anew.

Although this invention has been described in its preferred form with a certain degree of particularity, it is to be understood that numerous changes can be made without deviating from the invention as hereinafter claimed.

What is claimed:

1. A connection means for interconnecting two overlaying articles of clothing, the application having a length, said connection means comprising a tape, said tape having two sides and a length, said two sides each incorporating a selectively releasable attachment means substantially for the length of said tape, one side of said tape being removably attached to one of the two articles, the other side of the tape being removably attached to the other of the two articles and said length of said tape matching the length of the particular application whereby the two articles are held in fixed position overlaying each other.

2. The connection means of claim 1 characterized in that said length is taken off of a tape having a roll including multiple lengths of tape.

3. The connection means of claim 1 characterized in that said selectively releasable connection means has differing properties between the two sides of the tape.

4. A connection means for two articles of clothing, said connection means comprising a tape, said tape having two sides, said two sides each incorporating a selectively releasable attachment means substantially for the length of said tape, one side of said tape being attached to one of the two articles, and the other side of the tape being attached to the other of the two articles, said tape utilizing selectively releasable attachment means selected from a range of possible attachment means, an index means, and said index means indicating which selectively releasable attachment means is being utilized on which side of the tape.

5. The connection means of claim 4 characterized in that said index means includes an identification of the suitable article for said attachment means on a side.

6. The connection means of claim 4 characterized in that said index means includes an identification of use of said attachment means for a side.

7. A connection means for interconnecting two overlaying articles of clothing one of which has a length and a width, said connection means comprising a tape, said tape having two sides, said two sides of said tape being coated with a selectively releasable attachment means substantially for the length of said tape for removable connection with the two articles of clothing, said tape having a length and a width, said length and said width of said tape being substantially equal to said length and said width of said article of clothing, and said selectively releasable attachment means having differing properties of adhesion whereby the two articles of clothing are held in fixed position overlaying each other.

8. The connection means of claim 7 characterized in that said length is taken off of a tape having a roll including multiple lengths of tape.

9. A connection means for interconnecting two articles of clothing one of which has a length and a width, said connection means comprising a tape, said tape having two sides, said two sides of said tape being coated with a selectively releasable attachment means substantially for the length of said tape, said tape having a length and a width, said length and said width of said tape being substantially equal to said length and said width of said article of clothing, and said selectively releasable attachment means having differing properties of adhesion wherein there are a multiplicity of tapes utilizing differing selectively releasable attachment means and characterized by the improvement of an index means, and such index means indicating which selectively releasable attachment means is being utilized on which side of the tape.

10. The connection means of claim 9 characterized in that said index means includes an identification of the suitable article for said connection means on a side.

11. The connection means of claim 9 characterized in that said index means includes an identification of use of said attachment means for a side.

12. An connection means for selectively releasably interconnecting two articles of clothing, one of said articles having a length and a width, said connection means including a tape, said tape having a length and a width substantially equal to said length and said width of the article of clothing, said tape having two sides, said two sides being coated with a selectively releasable adhesive substantially for the length of said tape, index means to differentiate between said two sides of said tape, one side of said tape being stuck to one of the two articles of clothing and said other side of said tape being stuck to the other of the two articles of clothing.

13. The connection means of claim 12 wherein the tape is utilized in an application having a length, and characterized in that said length is taken off of a tape having a roll including multiple lengths of tape.

14. The connection means of claim 12 wherein the two articles of clothing have names and characterized in that said index means comprises an identification of the names of the articles of clothing.

15. The connection means of claim 12 characterized in that said index means includes a means to identify the strength of the adhesive means for said two sides of said tape respectively.

16. The connection means for selectively releasably interconnecting two articles of clothing having properties, said connection means including a tape, said tape having two sides, said two sides being coated with a selectively releasable adhesive substantially for the length of said tape, one side of said tape having an adhesive quality suitable for the properties of one of the two articles of clothing, said one side of said tape being stuck to one of the two articles of clothing, said other side of said tape having an adhesive quality suitable for the properties of the other of the two articles of clothing, said other side of said tape being stuck to said other of the two articles of clothing, an index means to differentiate between said two sides of tape, and said index means identifying said side suitable for the respective properties of the two articles of clothing so as to differentiate between said one side and said other side.

17. The connection means of claim 16 wherein the tape is utilized in an application having a length and characterized in that said length is taken off of a tape having a roll including multiple lengths of tape.

18. The connection means of claim 16 characterized in that said two sides of said tape have specific strengths of adhesiveness, and said index means including an identification of said strength of adhesiveness.

19. The connection means of claim 18 characterized in that said strengths of adhesiveness are identified by differing colors.

* * * * *